United States Patent
Takeshi

(10) Patent No.: US 10,168,779 B2
(45) Date of Patent: Jan. 1, 2019

(54) VEHICLE OPERATING DEVICE

(71) Applicant: HONDA MOTOR CO., LTD., Tokyo (JP)

(72) Inventor: Nobuteru Takeshi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 510 days.

(21) Appl. No.: 14/921,130

(22) Filed: Oct. 23, 2015

(65) Prior Publication Data
US 2016/0124511 A1 May 5, 2016

(30) Foreign Application Priority Data

Oct. 30, 2014 (JP) .................................. 2014-221252

(51) Int. Cl.
| | |
|---|---|
| *G06F 3/01* | (2006.01) |
| *G06F 3/041* | (2006.01) |
| *G06F 3/038* | (2013.01) |
| *G06F 3/0481* | (2013.01) |
| *G06F 3/0488* | (2013.01) |

(52) U.S. Cl.
CPC ............. *G06F 3/016* (2013.01); *G06F 3/038* (2013.01); *G06F 3/041* (2013.01); *G06F 3/04812* (2013.01); *G06F 3/04883* (2013.01)

(58) Field of Classification Search
CPC .......... G06F 3/016; G06F 3/038; G06F 3/044; G06F 3/041; G06F 3/03547; G06F 3/04883; G06F 3/04812
See application file for complete search history.

(56) References Cited

U.S. PATENT DOCUMENTS

| | | | | |
|---|---|---|---|---|
| 2004/0108995 A1* | 6/2004 | Hoshino | ................ | F16M 11/10 345/173 |
| 2013/0293466 A1* | 11/2013 | Shibata | ................... | G06F 3/016 345/157 |
| 2015/0009178 A1* | 1/2015 | Schneider | ............... | G06F 3/041 345/174 |

FOREIGN PATENT DOCUMENTS

JP      4568310 B2     10/2010

* cited by examiner

*Primary Examiner* — Nelson Rosario
*Assistant Examiner* — Andrew Lee
(74) *Attorney, Agent, or Firm* — Westerman, Hattori, Daniels & Adrian, LLP

(57) ABSTRACT

A vehicle operating device includes: a pad surface that is operated by contact with a finger of an operator; an X-direction actuator and a Y-direction actuator that move the pad surface in directions parallel to the pad surface; a track pad that detects a contact position of the finger of the operator on the pad surface; and a display controller and a display unit that display at least one item on a display screen, change a display mode on the display screen in accordance with the contact operation with the finger of the operator on the pad surface, and sets a virtual cursor that virtually moves on the display screen. When the virtual cursor reaches a boundary of the item, the X-direction actuator and the Y-direction actuator move the pad surface in a direction of the contact operation of the finger of the operator.

13 Claims, 14 Drawing Sheets

VEHICLE OPERATING DEVICE

CROSS REFERENCES TO RELATED APPLICATIONS

The present application claims priority under 35 U.S.C. § 119 to Japanese Patent Application No. 2014-221252, filed Oct. 30, 2014, entitled "Vehicle Operating Device." The contents of this application are incorporated herein by reference in their entirety.

TECHNICAL FIELD

The present disclosure relates to vehicle operating devices.

BACKGROUND

A known display device moves a display screen in accordance with a pressing force of a touch operation on the display screen of a display panel (see, for example, Japanese Patent No. 4568310).

SUMMARY

The known display device is required of appropriately providing a tactile feedback for contact movement operation on the display screen.

The present application describes a vehicle operating device that provides an appropriate tactile feedback for contact movement operation on a display screen. In the following explanation of the exemplary embodiment, specific elements with their reference numerals are indicated by using brackets. These specific elements are presented as mere examples in order to facilitate understanding, and thus, should not be interpreted as any limitation to the accompanying claims.

The present disclosure employs the following aspects. (1) A vehicle operating device according to one aspect of the present disclosure includes: an operation surface (e.g., a pad surface 11A of an embodiment) that is operated by contact with a finger of an operator; an operation surface driver (e.g., an X-direction actuator 27, a Y-direction actuator 28, an X-direction motor 55, and a Y-direction motor 56 of the embodiment) that moves the operation surface in a direction parallel to the operation surface; a contact position detector (e.g., a track pad 11 of the embodiment) that detects a contact position of the finger of the operator on the operation surface; and a display section (e.g., a display controller 13 and a display unit 14 of the embodiment) that displays at least one predetermined region (e.g., an item 31 of the embodiment) on a display screen (e.g., a display screen 14a of the embodiment), changes a display mode of the display screen in accordance with the contact operation with the finger of the operator on the operation surface, and sets a virtual cursor that virtually moves on the display screen. When the virtual cursor reaches a boundary of the predetermined region, the operation surface driver moves the operation surface in a direction of the contact operation with the finger of the operator.

(2) In the vehicle operating device (1), when the virtual cursor is at outside of the predetermined region, the operation surface driver moves the operation surface in a direction opposite to the direction of the contact operation.

(3) In the vehicle operating device (1), the operation surface driver causes a moving amount of the operation surface in a case where the virtual cursor reaches a boundary of the predetermined region from a state in which the virtual cursor is in contact with the predetermined region to a state in which the virtual cursor is not in contact with the predetermined region to be smaller than a moving amount of the operation surface in a case where the virtual cursor reaches the boundary of the predetermined region from a state in which the virtual cursor is not in contact with the predetermined region to a state in which the virtual cursor is in contact with the predetermined region.

(4) In the vehicle operating device (1), the operation surface driver includes: a first elastic member (e.g., an X-direction elastic member 51 of the embodiment) that applies an elastic force onto the operation surface in a first direction parallel to the operation surface; a second elastic member (e.g., a Y-direction elastic member 52 of the embodiment) that applies an elastic force onto the operation surface in a second direction parallel to the operation surface different from the first direction; a first cam member (e.g., an X-direction cam member 53 of the embodiment) that moves the operation surface in the first direction by rotation about a rotation axis; a second cam member (e.g., a Y-direction cam member 54 of the embodiment) that moves the operation surface in the second direction by rotation about a rotation axis; a first motor (e.g., an X-direction motor 55 of the embodiment) that rotates and drives the first cam member about the rotation axis; and a second motor (e.g., a Y-direction motor 56 of the embodiment) that rotates and drives the second cam member about the rotation axis.

(5) The vehicle operating device (1) further includes a controller (e.g., a display controller 13 of the embodiment) that outputs a signal indicating execution of a predetermined operation in accordance with the predetermined region in a state in which the virtual cursor is in contact with the predetermined region.

The vehicle operating device (1) includes the operation surface driver that moves the operation surface in the direction of the contact operation with the finger of the operator when the virtual cursor reaches the boundary of the predetermined region. Thus, the operator can feel as if the finger is attracted and attached to the boundary of the predetermined region and then stops. For example, the feeling that the finger is attracted and attached to the boundary of the predetermined region can make the operator feel as if the finger is placed on the boundary of the predetermined region. In this manner, for example, the operational feeling is more suitable for a change of the operating state, and thus, the tactile feedback can be more appropriately performed on the contact movement operation on the operation surface, than in the case of generating simple vibrations or the like.

In aspect (2), the operation surface driver moves the operation surface in the direction opposite to the direction of the contact operation when the virtual cursor is not in contact with the predetermined region. Thus, the moving amount of the operation surface obtained when the virtual cursor reaches the boundary of the predetermined region can be increased. In addition, it is possible to prevent a region (space) necessary for the movement of the pad surface from being excessively large.

In aspect (3), the operation surface driver causes the moving amount of the operation surface to differ between the case where the virtual cursor reaches the boundary from a position in the predetermined region and the case where the virtual cursor reaches the boundary from a position outside the predetermined region. Thus, different movements of the virtual cursor relative to the predetermined region can be appropriately distinguished and perceived by the operator.

In aspect (4), the operation surface driver further includes the first elastic member, the second elastic member, the cam members, and the motors. Thus, the operation surface can be moved in accordance with the state of movement of the virtual cursor relative to the predetermined region with a simple configuration.

In aspect (5), the vehicle operating device (1) further includes the controller that instructs execution of a predetermined operation in a state in which the virtual cursor is in contact with the predetermined region. Thus, the predetermined operation can be easily performed with the contact operation on the operation surface.

BRIEF DESCRIPTION OF THE DRAWINGS

The advantages of the disclosure will become apparent in the following description taken in conjunction with the following drawings.

DETAILED DESCRIPTION

A vehicle operating device according to an embodiment of the present disclosure will be described with reference to the attached drawings.

Figure 1:
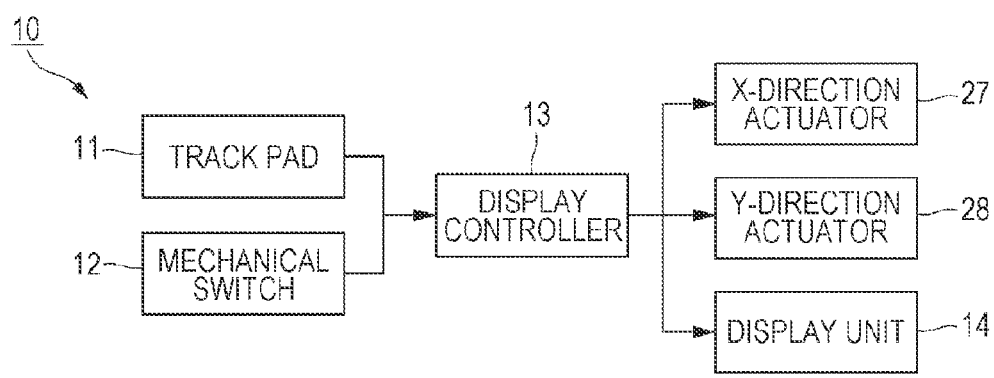
FIG. 1 is a block diagram illustrating a configuration of a vehicle operating device according to an embodiment of the present disclosure.
Figure 2:
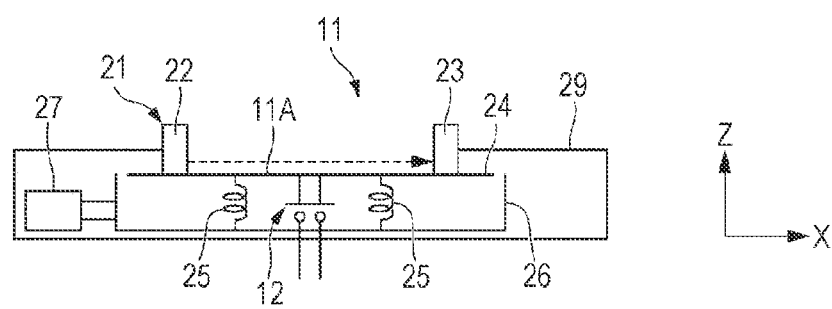
FIG. 2 is a cross-sectional view schematically illustrating the configuration of the vehicle operating device of the embodiment and which is taken perpendicularly to a pad surface.
Figure 3:
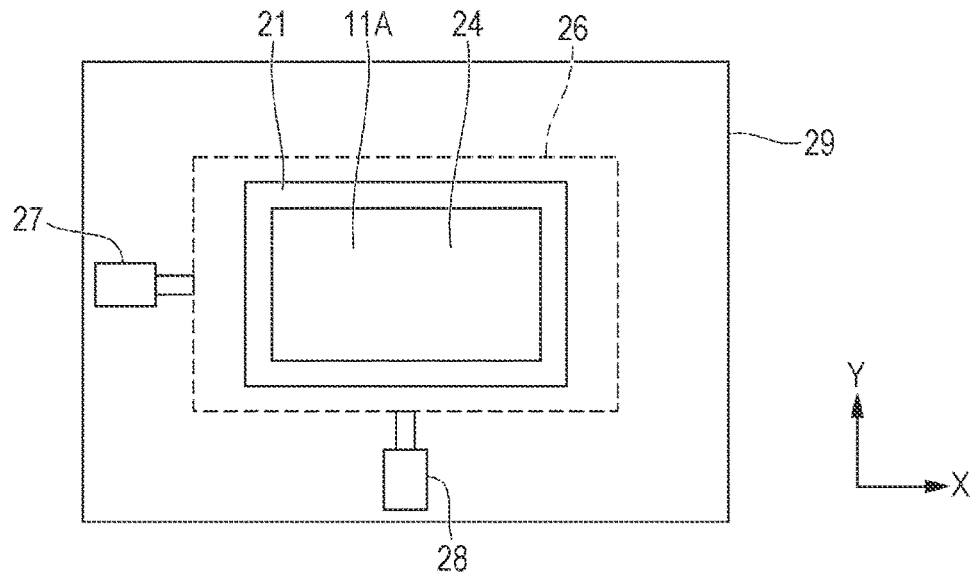
FIG. 3 is a top view schematically illustrating the configuration of the vehicle operating device of the embodiment when viewed in the normal direction (i.e., a Z-direction) to the pad surface.

As illustrated in FIGS. 1 through 3, a vehicle operating device 10 according to this embodiment includes a track pad 11, a mechanical switch 12, a display controller 13, and a display unit 14. The track pad 11 is, for example, an optical touch panel disposed on a center console of a vehicle. The track pad 11 includes at least a pair of a light-emitter 22 and a light-receiver 23 in a frame 21 surrounding an operation region of the pad surface 11A that is an operation surface. When light such as infrared rays emitted from the light-emitter 22 and scanning the operation region in the frame 21 is blocked by, for example, a finger on an operation region in the frame 21 before entering the light-receiver 23, the track pad 11 detects an operation input by detecting coordinates at which the light is blocked.

The track pad 11 includes an operation plate 24 having a pad surface 11A and a support member 26 that supports the operation plate 24 by means of an elastic member 25 such as a spring. The track pad 11 includes an X-direction actuator 27 and a Y-direction actuator 28 that respectively move the support member 26 in an X-direction and a Y-direction that are orthogonal to each other on a horizontal plane, and a housing 29 having an opening. An outer edge of the frame 21 of the track pad 11 is fixed to a portion around the opening of the housing 29. In this manner, the housing 29 houses the operation plate 24, the elastic member 25, the support member 26, the X-direction actuator 27, and the Y-direction actuator 28 with the pad surface 11A being exposed to the outside from the opening.

The operation plate 24 is connected to the mechanical switch 12. The operation plate 24 moves toward and away from the support member 26 in accordance with the elastic deformation of the elastic member 25. The mechanical switch 12 is off in a natural state of the elastic member 25, and is turned on when the operation plate 24 approaches the support member 26 with the elastic member 25 being elastically deformed. Thus, the mechanical switch 12 changes from the off state to the on state when the pad surface 11A is pressed by, for example, a finger such that the operation plate 24 is caused to approach the support member 26 against the elastic force of the elastic member 25.

The display controller 13 controls display operation of the display unit 14 in response to the operation input detected by the track pad 11 and the change between on and off of the mechanical switch 12. The display controller 13 controls operations of the X-direction actuator 27 and the Y-direction actuator 28 in accordance with the operation input detected by the track pad 11 and the display state of the display unit 14. Examples of the display unit 14 include a liquid crystal display unit disposed in, for example, an instrument panel of the vehicle.

The vehicle operating device 10 of this embodiment has the foregoing configuration. Operation of the vehicle operating device 10 will now be described.

Figure 4:
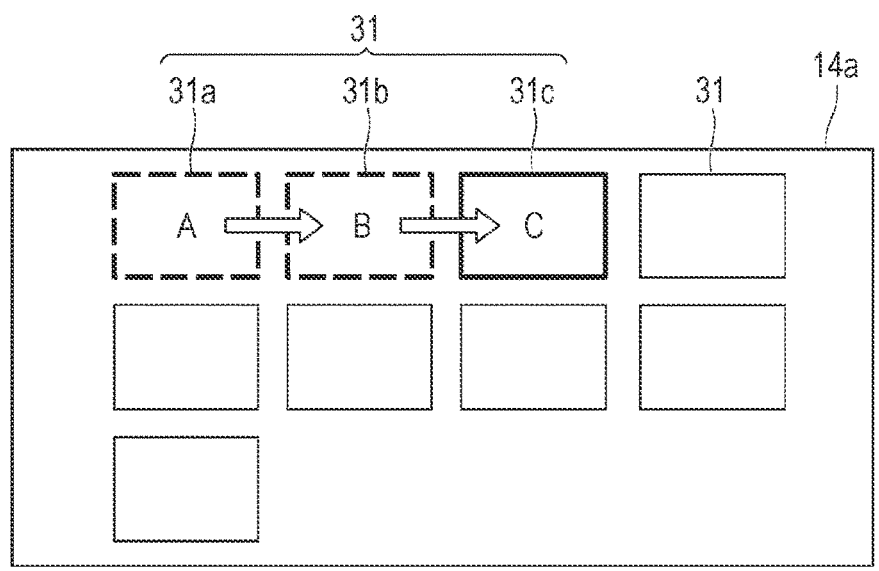
FIG. 4 illustrates an example of a display screen of a display unit in the vehicle operating device of the embodiment.
Figure 5:
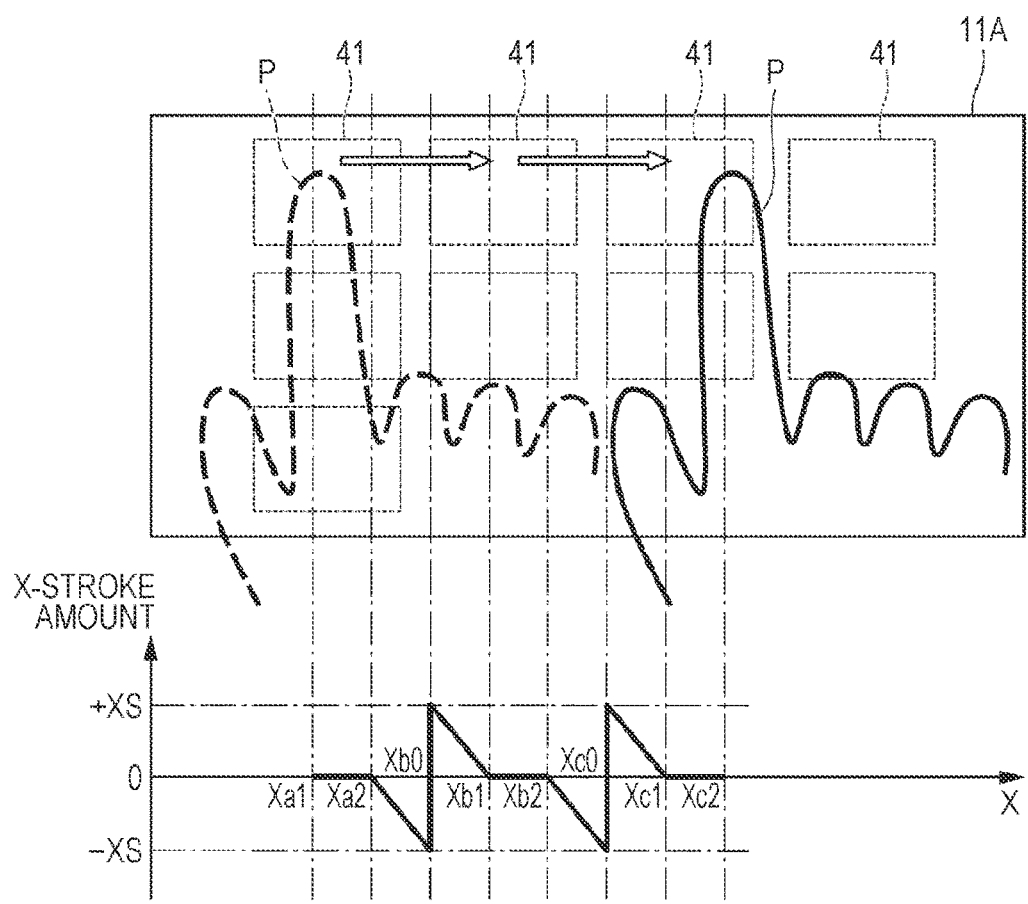
FIG. 5 illustrates an example of a relationship between a contact operation with a finger of an operator and an X-stroke amount in the pad surface of the track pad of the vehicle operating device of the embodiment.

The display controller 13 stores data on a relationship between coordinates set on the pad surface 11A of the track pad 11 and coordinates set on the display screen of the display unit 14. The display controller 13 determines a virtual cursor indicating a position on the display screen of the display unit 14 corresponding to a contact position with, for example, of a finger of an operator on the pad surface 11A of the track pad 11. The display controller 13 provides a display of a visible cursor or an emphasized display (e.g., highlighting) on a position on the display screen indicated by the virtual cursor. As illustrated in FIG. 4, when displaying a plurality of items 31 at predetermined intervals on a display screen 14a of the display unit 14, the display controller 13 emphasizes one of the items 31 located at a position on the display screen 14a corresponding to the contact position of the pad surface 11A. In this manner, in a case where the contact position on the pad surface 11A changes depending on a sliding operation by the finger of the operator, the display controller 13 changes the items 31 to be emphasized in accordance with the change of the contact position. When a finger P of the operator moves from a left upper portion to a right upper portion in the X-direction on the pad surface 11A while being in contact with the pad surface 11A as illustrated in FIG. 5, the display controller 13 sequentially displays and emphasizes a first item (A) 31a, a second item (B) 31b, and a third item (C) 31c disposed in this order from the left upper portion to the right upper portion on the display screen 14a as illustrated in FIG. 4. In FIG. 5, regions 41 corresponding to the regions of the items 31 are virtually shown by imaginary lines on positions on the pad surface 11A corresponding to the respective positions of the items 31 on the display screen 14a.

The display controller 13 moves the pad surface 11A by driving at least one of the X-direction actuator 27 and the Y-direction actuator 28 in accordance with a sliding operation by the finger of the operator on the pad surface 11A. When the virtual cursor reaches the boundary of a predetermined one of the items 31 in accordance with the sliding operation by the finger of the operator on the pad surface 11A, the display controller 13 moves the pad surface 11A in the direction of the contact operation with the finger of the operator by driving at least one of the X-direction actuator 27 and the Y-direction actuator 28. When displacing the pad surface 11A in the direction of the contact operation with the finger of the operator, the display controller 13 produces a stepped movement (e.g., within a time of 10 ms) such that the movement of the pad surface 11A is tactilely perceived with the finger of the operator. When the virtual cursor moves outside a predetermined one of the items 31 in accordance with the sliding operation by the finger of the operator on the pad surface 11A, the display controller 13 moves the pad surface 11A in the direction opposite to the direction of contact operation with the finger of the operator by driving at least one of the X-direction actuator 27 and the Y-direction actuator 28. In displacing the pad surface 11A in the direction opposite to the direction of contact operation with the finger of the operator, the movement of the pad surface 11A by the display controller 13 gradually changes so as not to be tactilely perceived with the finger of the operator. When the virtual cursor is located within a predetermined region of each of the items 31 in accordance with the sliding operation by the finger of the operator on the pad surface 11A, the display controller 13 stops driving the X-direction actuator 27 and the Y-direction actuator 28 so that the position (e.g., the center) of the pad surface 11A coincides with a predetermined reference position.

As illustrated in FIG. 5, when the finger P of the operator moves from the left upper portion to the right upper portion on the pad surface 11A in a positive X-direction while being in contact with the pad surface 11A, the display controller 13 drives the X-direction actuator 27 by sequentially selecting the items 31 one by one as a predetermined item 31 to which the virtual cursor moves (i.e., an item 31 with which the virtual cursor newly comes in contact). Specifically, first, when the virtual cursor moves from the first item (A) 31a outside the second item (B) 31b toward the second item (B) 31b, the display controller 13 uses the second item (B) 31b as the predetermined item 31. When the virtual cursor moves from the first item (A) 31a outside the second item (B) 31b toward the second item (B) 31b, the display controller 13 stops driving the X-direction actuator 27 in a predetermined region of the first item (A) 31a. In regions except the predetermined region of the first item (A) 31a, the display controller 13 moves the pad surface 11A in the direction opposite to the direction of contact operation with the finger P (i.e., a negative X-direction) by driving the X-direction actuator 27. In this manner, the amount of movement from the reference position in the X-direction (an X-stroke amount) of the pad surface 11A is zero in a region from a position Xa1 to a position Xa2 in the X-direction corresponding to the predetermined region of the first item (A) 31a. In a region from the position Xa2 to a position Xb0 at the boundary of the second item (B) 31b adjacent to the first item (A) 31a in the X-direction corresponding to a region except the predetermined region of the first item (A) 31a, the X-stroke amount decreases from zero to the minimum value (=−XS) as the contact position of the finger P moves in the positive X-direction. Next, when the virtual cursor reaches the boundary of the second item (B) 31b, the display controller 13 moves the pad surface 11A in the direction of contact operation (i.e., the positive X-direction) with the finger P by driving the X-direction actuator 27. In this manner, the X-stroke amount changes stepwise (e.g., within a time of 10 ms) from the minimum value (=−XS) to the maximum value (=+XS).

The range from the minimum value (=−XS) to the maximum value (=+XS) of the X-stroke amount is determined such that the operator feels as if the finger P is attracted and attached to the boundary of the predetermined region and then stops without discomfort of the operator. The absolute value of each of the minimum value (=−XS) and the maximum value (=+XS) is an elastic degree of the skin of the finger P or a value obtained by adding a predetermined amount a to the elastic degree of the skin of the finger P, and is in the range from about 1.5 mm to about 2 mm. If the X-stroke amount is excessively small, neither the feeling of the direction to which the finger P is attracted nor the feeling that the finger P is attracted and stops is perceived by the operator. On the other hand, if the X-stroke amount is excessively large, this excessive operation is transmitted to the finger P so that the operator feels discomfort.

Then, when the virtual cursor moves from the second item (B) 31b outside the third item (C) 31c toward the third item (C) 31c, the display controller 13 uses the third item (C) 31c as the predetermined item 31. When the virtual cursor moves from the second item (B) 31b outside the third item (C) 31c toward the third item (C) 31c, the display controller 13 stops driving the X-direction actuator 27 in a predetermined region of the second item (B) 31b. In regions except the predetermined region of the second item (B) 31b, the display controller 13 moves the pad surface 11A in the direction opposite to the direction of contact operation with the finger P (i.e., the negative X-direction) by driving the X-direction actuator 27. In this manner, in a region from the position Xb0 to a position Xb1 in the X-direction corresponding to a region except the predetermined region of the second item (B) 31b, the X-stroke amount decreases from the maximum value (=+XS) to zero as the contact position of the finger P moves in the positive X-direction. In a region from the position Xb1 to the position Xb2 in the X-direction corresponding to the predetermined region of the second item (B) 31b, the X-stroke amount is zero. In a region from the position Xb2 to a position Xc0 at the boundary of the third item (C) 31c adjacent to the second item (B) 31b in the X-direction corresponding to a region except the predetermined region of the second item (B) 31b, the X-stroke amount decreases from zero to the minimum value (=−XS) as the contact position of the finger P moves in the positive X-direction. Then, when the virtual cursor reaches the boundary of the third item (C) 31c, the display controller 13 moves the pad surface 11A in the direction of contact operation with the finger P (i.e., the positive X-direction) by driving the X-direction actuator 27. In this manner, the X-stroke amount changes stepwise (e.g., within a time of 10 ms) from the minimum value (=−XS) to the maximum value (=+XS).

Thereafter, when the virtual cursor moves in the third item (C) 31c, the display controller 13 stops driving the X-direction actuator 27 in a predetermined region of the third item (C) 31c. In regions except the predetermined region of the third item (C) 31c, the display controller 13 moves the pad surface 11A in the direction opposite to the direction of contact operation with the finger P (i.e., the negative X-direction) by driving the X-direction actuator 27. In this manner, in a region from the position Xc0 to a position Xc1 in the X-direction corresponding to a region except the predetermined region of the third item (C) 31c, the X-stroke amount decreases from the maximum value (=+XS) to zero as the contact position of the finger P moves in the positive X-direction. In a region from the position Xc1 to a position Xc2 in the X-direction corresponding to the predetermined region of the third item (C) 31c, the X-stroke amount is zero. In subsequent regions from the position Xc2 in the X-direction corresponding to regions except the predetermined region of the third item (C) 31c, the X-stroke amount decreases from zero to the minimum value (=−XS) as the contact position of the finger P moves in the positive X-direction.

Figure 6:
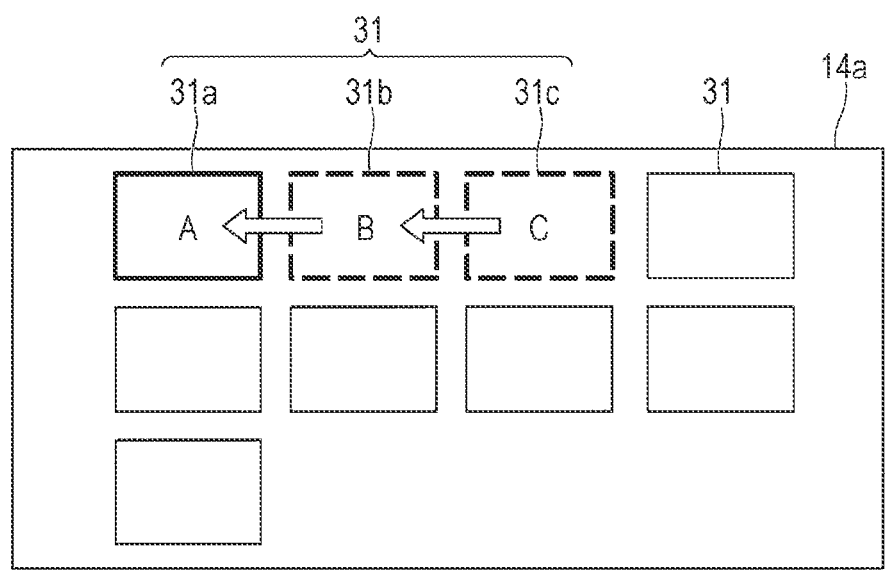
FIG. 6 illustrates an example of the display screen of the display unit in the vehicle operating device of the embodiment.
Figure 7:
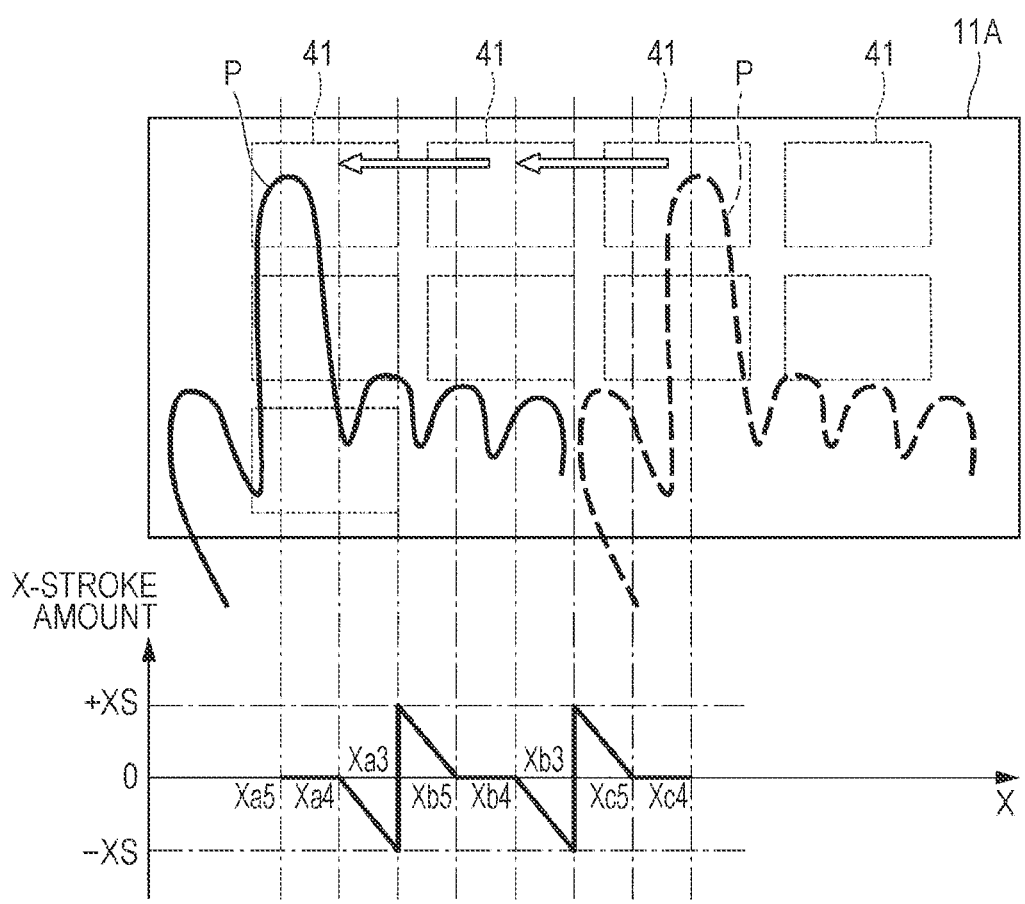
FIG. 7 illustrates an example of a relationship between the contact operation with the finger of the operator and the X-stroke amount on the pad surface of the track pad in the vehicle operating device of the embodiment.

As illustrated in FIGS. 6 and 7, when the finger P of the operator moves from a right upper portion to a left upper portion in the X-direction on the pad surface 11A while being in contact with the pad surface 11A, the display controller 13 sequentially displays and emphasizes the third item (C) 31c, the second item (B) 31b, and the first item (A) 31a disposed in this order from the right upper portion to the left upper portion on the display screen 14a. In FIG. 7, regions 41 corresponding to the regions of the items 31 are virtually shown by imaginary lines on positions on the pad surface 11A corresponding to the respective positions of the items 31 on the display screen 14a. As illustrated in FIG. 7, when the finger P of the operator moves from the right upper portion to the left upper portion on the pad surface 11A in the negative X-direction while being in contact with the pad surface 11A, the display controller 13 drives the X-direction actuator 27 by sequentially selecting the items 31 one by one as a predetermined item 31 to which the virtual cursor moves (i.e., an item 31 with which the virtual cursor newly comes in contact).

Specifically, first, when the virtual cursor moves from the third item (C) 31c outside the second item (B) 31b toward the second item (B) 31b, the display controller 13 uses the second item (B) 31b as the predetermined item 31. When the virtual cursor moves from the third item (C) 31c outside the second item (B) 31b toward the second item (B) 31b, the display controller 13 stops driving the X-direction actuator 27 in a predetermined region of the third item (C) 31c. In regions except the predetermined region of the third item (C) 31c, the display controller 13 moves the pad surface 11A in the direction opposite to the direction of contact operation with the finger P (i.e., the positive X-direction) by driving the X-direction actuator 27. In this manner, the X-stroke amount is zero in a region from a position Xc4 to a position Xc5 in the X-direction corresponding to the predetermined region of the third item (C) 31c. In a region from the position Xc5 to a position Xb3 at the boundary of the second item (B) 31b adjacent to the third item (C) 31c in the X-direction corresponding to a region except the predetermined region of the third item (C) 31c, the X-stroke amount increases from zero to the maximum value (=+XS) as the contact position of the finger P moves in the negative X-direction. Next, when the virtual cursor reaches the boundary of the second item (B) 31b, the display controller 13 moves the pad surface 11A in the direction of contact operation with the finger P (i.e., the negative X-direction) by driving the X-direction actuator 27. In this manner, the X-stroke amount changes stepwise (e.g., within a time of 10 ms) from the maximum value (=+XS) to the minimum value (=−XS).

Then, when the virtual cursor moves from the second item (B) 31b outside the first item (A) 31a toward the first item (A) 31a, the display controller 13 uses the first item (A) 31a as the predetermined item 31. When the virtual cursor moves from the second item (B) 31b outside the first item (A) 31a toward the first item (A) 31a, the display controller 13 stops driving the X-direction actuator 27 in the predetermined region of the second item (B) 31b. In regions except the predetermined region of the second item (B) 31b, the display controller 13 moves the pad surface 11A in the direction opposite to the direction of contact operation with the finger P (i.e., the positive X-direction) by driving the X-direction actuator 27. In this manner, in a region from the position Xb3 to a position Xb4 in the X-direction corresponding to the predetermined region of the second item (B) 31b, the X-stroke amount increases from the minimum value (=−XS) to zero as the contact position of the finger P moves in the negative X-direction. In a region from the position Xb4 to a position Xb5 in the X-direction corresponding to the predetermined region of the second item (B) 31b, the X-stroke amount is zero. In a region from the position Xb5 to a position Xa3 at the boundary of the first item (A) 31a adjacent to the second item (B) 31b in the X-direction corresponding to a region except the predetermined region of the second item (B) 31b, the X-stroke amount increases from zero to the maximum value (=+XS) as the contact position of the finger P moves in the negative X-direction. Then, when the virtual cursor reaches the boundary of the first item (A) 31*a*, the display controller 13 moves the pad surface 11A in the direction of contact operation with the finger P (i.e., the negative X-direction) by driving the X-direction actuator 27. In this manner, the X-stroke amount changes stepwise (e.g., within a time of 10 ms) from the maximum value (=+XS) to the minimum value (=−XS).

Thereafter, when the virtual cursor moves in the first item (A) 31*a*, the display controller 13 stops driving the X-direction actuator 27 in the predetermined region of the first item (A) 31*a*. In regions except the predetermined region of the first item (A) 31*a*, the display controller 13 moves the pad surface 11A in the direction opposite to the direction of contact operation with the finger P (i.e., the positive X-direction) by driving the X-direction actuator 27. In this manner, in a region from the position Xa3 to a position Xa4 in the X-direction corresponding to a region except the predetermined region of the first item (A) 31*a*, the X-stroke amount changes from the minimum value (=−XS) to zero as the contact position of the finger P moves in the negative X-direction. In a region from the position Xa4 to a position Xa5 in the X-direction corresponding to the predetermined region of the first item (A) 31*a*, the X-stroke amount is zero. In subsequent regions from the position Xa5 in the X-direction corresponding to regions except the predetermined region of the first item (A) 31*a*, the X-stroke amount increases from zero to the maximum value (=+XS) as the contact position of the finger P moves in the negative X-direction.

That is, when the finger P of the operator reciprocates in the predetermined directions on the pad surface 11A, the display controller 13 reverses the change of the moving amount (the stroke amount) of the pad surface 11A from a reference position to a predetermined position between the forward and rearward directions with time.

As described above, the vehicle operating device 10 of this embodiment includes the X-direction actuator 27 and the Y-direction actuator 28 that move the pad surface 11A in the direction of contact operation with the finger of the operator when the virtual cursor reaches the boundary of a predetermined region (i.e., the predetermined item 31). Thus, the operator feels as if the finger is attracted and attached to the boundary of the predetermined region and stops. For example, the feeling that the finger is attracted and attached to the boundary of the predetermined region can create the feeling that the finger is placed on the boundary of the predetermined region. In this manner, the operational feeling is more suitable for a change of the operating state than, for example, in the case of generating simple vibrations or the like. This may increase leeway to move the pad surface 11A in the contact operation direction. Thus, the tactile feedback is more appropriately performed on the contact movement operation on the pad surface 11A.

In addition, in a case where the virtual cursor is not in contact with the predetermined region, the X-direction actuator 27 and the Y-direction actuator 28 move the pad surface 11A in the direction opposite to the direction in the contact operation method. Thus, the amount of movement of the pad surface 11A obtained when the virtual cursor reaches the boundary of the predetermined region can be increased. Furthermore, it is possible to prevent a region (space) necessary for the movement of the pad surface 11A from being excessively large.

A first variation of the above-described embodiment will now be described. In the embodiment described above, the display controller 13 stops driving the X-direction actuator 27 and the Y-direction actuator 28 when the virtual cursor is located in the predetermined region of one of the items 31 in accordance with the sliding operation by the finger of the operator on the pad surface 11A. However, the present disclosure is not limited to this example. When the virtual cursor is located at a position corresponding to a predetermined position in one of the items 31, the display controller 13 may stop driving the X-direction actuator 27 and the Y-direction actuator 28 such that the position (e.g., the center) on the pad surface 11A coincides with a predetermined reference position.

Figure 8:
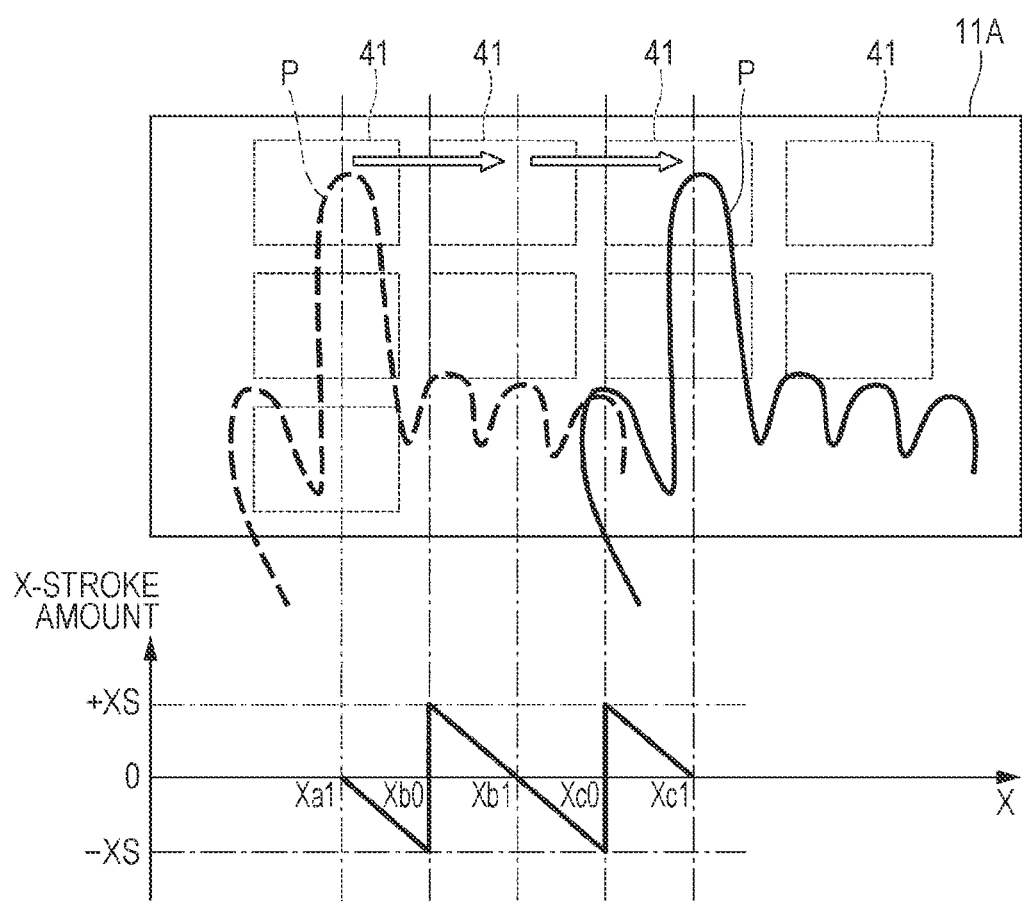
FIG. 8 illustrates an example of a relationship between the contact operation with the finger of the operator and the X-stroke amount on the pad surface of the track pad in the vehicle operating device according to a first variation of the embodiment.

As illustrated in FIG. 8, when the finger P of the operator moves from a left upper portion toward a right upper portion on the pad surface 11A in the positive X-direction while being in contact with the pad surface 11A, the display controller 13 drives the X-direction actuator 27 sequentially selecting the items 31 one by one as a predetermined item 31 to which the virtual cursor moves. In FIG. 7, regions 41 corresponding to the regions of the items 31 are virtually shown by imaginary lines on positions on the pad surface 11A corresponding to the respective positions of the items 31 on the display screen 14*a*. Specifically, first, as illustrated in FIG. 4, when the virtual cursor moves from the first item (A) 31*a* outside the second item (B) 31*b* toward the second item (B) 31*b*, the display controller 13 uses the second item (B) 31*b* as the predetermined item 31. When the virtual cursor moves from the first item (A) 31*a* outside the second item (B) 31*b* toward the second item (B) 31*b*, the display controller 13 stops driving the X-direction actuator 27 at a predetermined position in the first item (A) 31*a*. At positions except the predetermined position in the first item (A) 31*a*, the display controller 13 moves the pad surface 11A in the direction opposite to the direction of contact operation with the finger P (i.e., the negative X-direction) by driving the X-direction actuator 27. In this manner, the X-stroke amount is zero at the position Xa1 in the X-direction corresponding to the predetermined position in the first item (A) 31*a*. In a region from the position Xa1 to the position Xb0 at the boundary of the second item (B) 31*b* adjacent to the first item (A) 31*a* in the X-direction corresponding to a position except the predetermined position in the first item (A) 31*a*, the X-stroke amount decreases from zero to the minimum value (=−XS) as the contact position of the finger P moves in the positive X-direction. Next, when the virtual cursor reaches the boundary of the second item (B) 31*b*, the display controller 13 moves the pad surface 11A in the direction of contact operation with the finger P (i.e., the positive X-direction) by driving the X-direction actuator 27. In this manner, the X-stroke amount changes stepwise (e.g., within a time of 10 ms) from the minimum value (=−XS) to the maximum value (=+XS).

Then, when the virtual cursor moves from the second item (B) 31*b* outside the third item (C) 31*c* toward the third item (C) 31*c*, the display controller 13 uses the third item (C) 31*c* as the predetermined item 31. When the virtual cursor moves from the second item (B) 31*b* outside the third item (C) 31*c* toward the third item (C) 31*c*, the display controller 13 stops driving the X-direction actuator 27 at the predetermined position in the second item (B) 31*b*. The display controller 13 moves the pad surface 11A in the direction opposite to the direction of contact operation with the finger P (i.e., the negative X-direction) by driving the X-direction actuator 27 at positions except the predetermined position in the second item (B) 31*b*. In this manner, in a region from the position Xb0 to the position Xb1 in the X-direction corresponding to a position except the predetermined position in the second item (B) 31*b*, the X-stroke amount decreases from the maximum value (=+XS) to zero as the contact position of the finger P moves in the positive X-direction. At the position Xb1 in the X-direction corresponding to the predetermined position in the second item (B) 31b, the X-stroke amount is zero. In a region from the position Xb1 to the position Xc0 at the boundary of the third item (C) 31c adjacent to the second item (B) 31b in the X-direction corresponding to a position except the predetermined position in the second item (B) 31b, the X-stroke amount decreases from zero to the minimum value (=−XS) as the contact position of the finger P moves in the positive X-direction. Thereafter, when the virtual cursor reaches the boundary of the third item (C) 31c, the display controller 13 moves the pad surface 11A in the direction of contact operation with the finger P (i.e., the positive X-direction) by driving the X-direction actuator 27. In this manner, the X-stroke amount changes stepwise (e.g., within a time of 10 ms) from the minimum value (=−XS) to the maximum value (=+XS).

Subsequently, when the virtual cursor moves in the third item (C) 31c, the display controller 13 stops driving the X-direction actuator 27 at a predetermined position in the third item (C) 31c. At positions except the predetermined position in the third item (C) 31c, the display controller 13 moves the pad surface 11A in the direction opposite to the direction of contact operation with the finger P (i.e., the negative X-direction) by driving the X-direction actuator 27. In this manner, in a region from the position Xc0 to the position Xc1 in the X-direction corresponding to a position except the predetermined position in the third item (C) 31c, the X-stroke amount decreases from the maximum value (=+XS) to zero as the contact position of the finger P moves in the positive X-direction. At the position Xc1 in the X-direction corresponding to the predetermined position in the third item (C) 31c, the X-stroke amount is zero. At subsequent positions after the position Xc1 in the X-direction corresponding to positions except the predetermined position in the third item (C) 31c, the X-stroke amount decreases from zero to the minimum value (=−XS) as the contact position of the finger P moves in the positive X-direction.

A second variation of the above-described embodiment will now be described. In the embodiment described above, when the virtual cursor reaches the boundary of the predetermined item 31 from the outside of the predetermined item 31 toward the inside in accordance with the sliding operation by the finger of the operator on the pad surface 11A, the display controller 13 moves the pad surface 11A in the direction of contact operation. However, the present disclosure is not limited to this example. The display controller 13 may move the pad surface 11A in the direction of contact operation when the virtual cursor reaches the boundaries of the items 31 as well as the predetermined item 31, that is, the item 31 with which the virtual cursor newly comes in contact. In the case where the display controller 13 moves the pad surface 11A in the direction of contact operation in accordance with the sliding operation by the finger of the operator on the pad surface 11A, the amount of operation surface when the virtual cursor reaches the boundary from the inside of each of the items 31 toward the outside may be smaller than the amount of operation surface when the virtual cursor reaches the boundary from the outside of each of the items 31 toward the inside.

Figure 9:
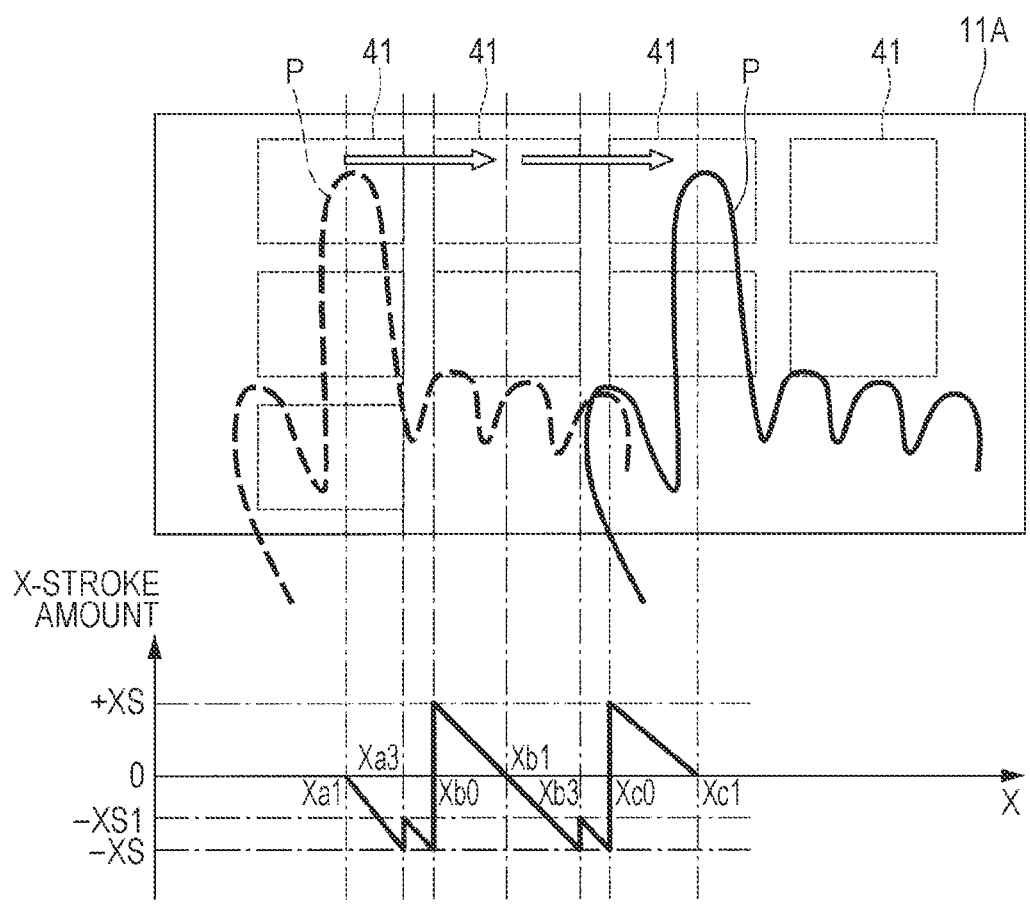
FIG. 9 illustrates an example of a relationship between the contact operation with the finger of the operator and the X-stroke amount on the pad surface of the track pad in the vehicle operating device according to a second variation of the embodiment.

As illustrated in FIG. 9, when the finger P of the operator moves from a left upper portion toward a right upper portion on the pad surface 11A in the positive X-direction while being in contact with the pad surface 11A, the display controller 13 drives the X-direction actuator 27 in accordance with the boundary of one of the items 31 to which the virtual cursor moves. In FIG. 9, regions 41 corresponding to the regions of the items 31 are virtually shown by imaginary lines on positions on the pad surface 11A corresponding to the respective positions of the items 31 on the display screen 14a. Specifically, first, as illustrated in FIG. 4, when the virtual cursor moves from the first item (A) 31a toward the second item (B) 31b, the display controller 13 stops driving the X-direction actuator 27 at a predetermined position in the first item (A) 31a. At positions except the predetermined position in the first item (A) 31a, the display controller 13 moves the pad surface 11A in the direction opposite to the direction of contact operation with the finger P (i.e., the negative X-direction) by driving the X-direction actuator 27. In this manner, the X-stroke amount is zero at the position Xa1 in the X-direction corresponding to the predetermined position in the first item (A) 31a. In a region from the position Xa1 to the position Xa3 at the boundary of the first item (A) 31a adjacent to the second item (B) 31b in the X-direction corresponding to a position except the predetermined position in the first item (A) 31a, the X-stroke amount decreases from zero to the minimum value (=−XS) as the contact position of the finger P moves in the positive X-direction.

Next, when the virtual cursor reaches the boundary of the first item (A) 31a, the display controller 13 moves the pad surface 11A in the direction of contact operation with the finger P (i.e., the positive X-direction) by driving the X-direction actuator 27. In this manner, the X-stroke amount changes stepwise (e.g., within a time of 10 ms) from the minimum value (=−XS) to a predetermined value (=−XS1). The predetermined value (=−XS1) is larger than the minimum value (=−XS) and smaller than the maximum value (=+XS). Then, when the virtual cursor is located between the first item (A) 31a and the second item (B) 31b, the display controller 13 moves the pad surface 11A in the direction opposite to the direction of contact operation with the finger P (i.e., the negative X-direction) by driving the X-direction actuator 27. In this manner, in a region from the first item (A) 31a to the second item (B) 31b, the X-stroke amount decreases from the predetermined value (=−XS1) to the minimum value (=−XS) as the contact position of the finger P moves in the positive X-direction. Thereafter, when the virtual cursor reaches the position Xb0 at the boundary between the second item (B) 31b and the first item (A) 31a, the display controller 13 moves the pad surface 11A in the direction of contact operation with the finger P (i.e., the positive X-direction) by driving the X-direction actuator 27. In this manner, the X-stroke amount changes stepwise (e.g., within a time of 10 ms) from the minimum value (=−XS) to the maximum value (=+XS).

Subsequently, when the virtual cursor moves from the second item (B) 31b toward the third item (C) 31c, the display controller 13 stops driving the X-direction actuator 27 at the predetermined position in the second item (B) 31b. At positions except the predetermined position in the second item (B) 31b, the display controller 13 moves the pad surface 11A in the direction opposite to the direction of contact operation with the finger P (i.e., the negative X-direction) by driving the X-direction actuator 27. In this manner, in a region from the position Xb0 to the position Xb1 in the X-direction corresponding to a position except the predetermined position in the second item (B) 31b, the X-stroke amount decreases from the maximum value (=+XS) to zero as the contact position of the finger P moves in the positive X-direction. At the position Xb1 in the X-direction corresponding to the predetermined position in the second item (B) 31*b*, the X-stroke amount is zero. In a region from the position Xb1 to the position Xb3 at the boundary of the second item (B) 31*b* adjacent to the third item (C) 31*c* in the X-direction corresponding to a position except the predetermined position in the second item (B) 31*b*, the X-stroke amount decreases from zero to the minimum value (=−XS) as the contact position of the finger P moves in the positive X-direction.

Then, when the virtual cursor reaches the boundary of the second item (B) 31*b*, the display controller 13 moves the pad surface 11A in the direction of contact operation with the finger P (i.e., the positive X-direction) by driving the X-direction actuator 27. In this manner, the X-stroke amount changes stepwise (e.g., within a time of 10 ms) from the minimum value (=−XS) to the predetermined value (=−XS1). Thereafter, when the virtual cursor is located between the second item (B) 31*b* and the third item (C) 31*c*, the display controller 13 moves the pad surface 11A in the direction opposite to the direction of contact operation with the finger P (i.e., the negative X-direction) by driving the X-direction actuator 27. In this manner, in the region from the second item (B) 31*b* to the third item (C) 31*c*, the X-stroke amount decreases from the predetermined value (=−XS1) to the minimum value (=−XS) as the contact position of the finger P moves in the positive X-direction. Then, when the virtual cursor reaches the position Xc0 at the boundary of the third item (C) 31*c* adjacent to the second item (B) 31*b*, the display controller 13 displaces the pad surface 11A in the direction of contact operation with the finger P (i.e., the positive X-direction) by driving the X-direction actuator 27. In this manner, the X-stroke amount changes stepwise (e.g., within a time of 10 ms) from the minimum value (=−XS) to the maximum value (=+XS).

Subsequently, when the virtual cursor moves in the third item (C) 31*c*, the display controller 13 stops driving the X-direction actuator 27 at a predetermined position in the third item (C) 31*c*. At positions except the predetermined position in the third item (C) 31*c*, the display controller 13 moves the pad surface 11A in the direction opposite to the direction of contact operation with the finger P (i.e., the negative X-direction) by driving the X-direction actuator 27. In this manner, in a region from the position Xc0 to the position Xc1 in the X-direction corresponding to a position except the predetermined position in the third item (C) 31*c*, the X-stroke amount decreases from the maximum value (=+XS) to zero as the contact position of the finger P moves in the positive X-direction. At the position Xc1 in the X-direction corresponding to the predetermined position in the third item (C) 31*c*, the X-stroke amount is zero. At subsequent positions after the position Xc1 in the X-direction corresponding to positions except the predetermined position in the third item (C) 31*c*, the X-stroke amount decreases from zero to the minimum value (=−XS) as the contact position of the finger P moves in the positive X-direction.

A third variation of the above-described embodiment will now be described. In the embodiment described above, when displacing the pad surface 11A in the direction opposite to the direction of contact operation with the finger of the operator, the display controller 13 prevents the movement of the pad surface 11A from being tactilely perceived with the finger of the operator. However, the present disclosure is not limited to this example. In displacing the pad surface 11A in the direction opposite to the direction of contact operation with the finger of the operator near the boundary of the predetermined item 31, for example, the display controller 13 may notify the operator that the virtual cursor approaches the boundary of the predetermined item 31 by generating vibrations (e.g., microvibrations) that can be tactilely perceived with the finger of the operator.

In the above embodiment, the X-direction actuator 27 and the Y-direction actuator 28 may be disposed at the respective ends in the X-direction and the Y-direction of the support member 26 or may be at the end in a Z-direction of the support member 26.

Figure 10:
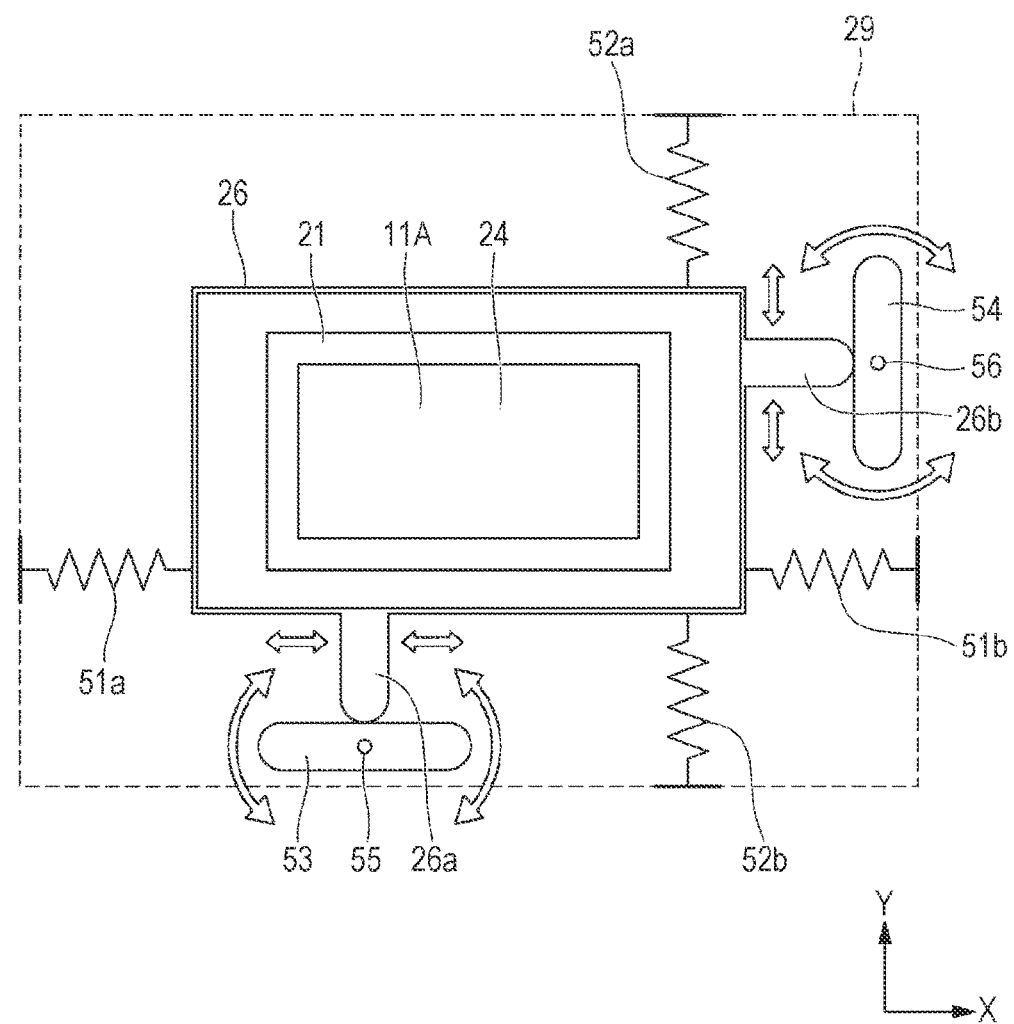
FIG. 10 is a top view schematically illustrating the configuration of a vehicle operating device according to a fourth variation of the embodiment when viewed in the normal direction (i.e., the Z-direction) to the pad surface.

A fourth variation of the above-described embodiment will now be described. In the embodiment described above, the track pad 11 includes the X-direction actuator 27 and the Y-direction actuator 28. However, the present disclosure is not limited to this example. As illustrated in FIG. 10, instead of the X-direction actuator 27 and the Y-direction actuator 28, the track pad 11 may include an X-direction elastic member 51, a Y-direction elastic member 52, an X-direction cam member 53, a Y-direction cam member 54, an X-direction motor 55, and a Y-direction motor 56.

The X-direction elastic member 51 includes a pair of spring members 51*a* and 51*b* that are connected between the housing 29 and the support member 26 in the X-direction and maintain the position (e.g., the center) of the pad surface 11A at a predetermined reference position relative to the housing 29 in a natural state. The Y-direction elastic member 52 includes a pair of spring members 52*a* and 52*b* that are connected to between the housing 29 and the support member 26 in the Y-direction and maintain the position (e.g., the center) of the pad surface 11A at a predetermined reference position relative to the housing 29 in a natural state.

The outer shape of the X-direction cam member 53 is, for example, a rectangular plate with rounded corners. The center axis of the X-direction cam member 53 is connected to the X-direction motor 55. The X-direction cam member 53 rotates about the center axis during each of normal rotation and reverse rotation of the X-direction motor 55. The outer peripheral surface of the X-direction cam member 53 is in contact with a first lever member 26*a* projecting from the surface of the support member 26 in the Y-direction. In this manner, the X-direction cam member 53 rotates about the center axis under a driving force of the X-direction motor 55 so that the first lever member 26*a* and the support member 26 are moved in the X-direction against an elastic force of the X-direction elastic member 51.

The outer shape of the Y-direction cam member 54 is, for example, a rectangular plate with rounded corners. The center axis of the Y-direction cam member 54 is connected to the Y-direction motor 56. The Y-direction cam member 54 rotates about the center axis during each of normal rotation and reverse rotation of the Y-direction motor 56. The outer peripheral surface of the Y-direction cam member 54 is in contact with a second lever member 26*b* projecting from the surface of the support member 26 in the X-direction. In this manner, the Y-direction cam member 54 rotates about the center axis under a driving force of the Y-direction motor 56 so that the second lever member 26*b* and the support member 26 are moved in the Y-direction against an elastic force of the Y-direction elastic member 52.

In the fourth variation, the display controller 13 controls operations of the X-direction motor 55 and Y-direction motor 56 in accordance with an operation input detected by the track pad 11 and the display state of the display unit 14. The display controller 13 moves the pad surface 11A by driving at least one of the X-direction motor 55 and the Y-direction motor 56 in accordance with a sliding operation by the finger of the operator on the pad surface 11A.

Figure 11:
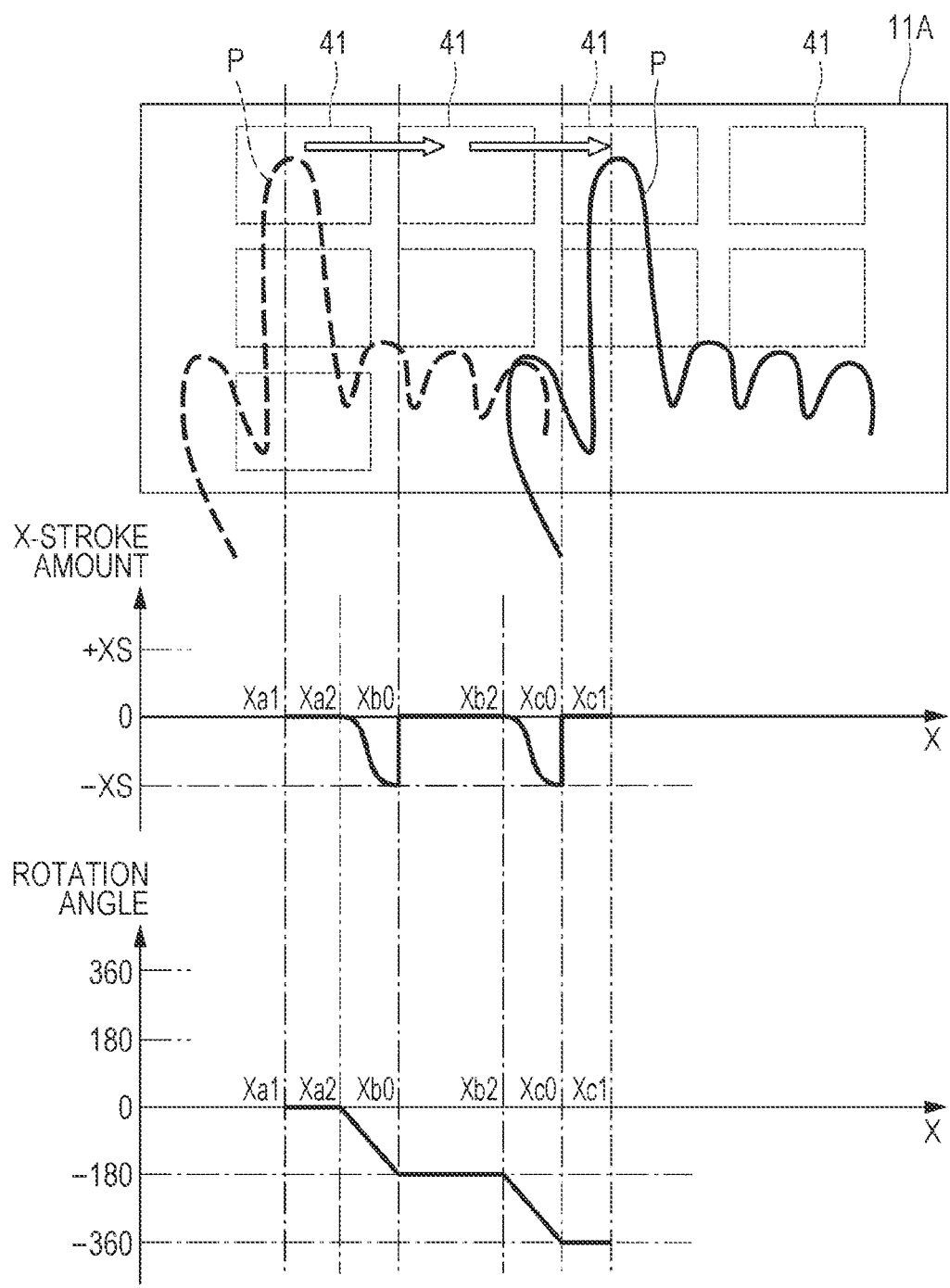
FIG. 11 illustrates an example of a relationship between the contact operation with the finger of the operator and the X-stroke amount on the pad surface of the track pad in the vehicle operating device according to a fourth variation of the embodiment.
Figure 12:
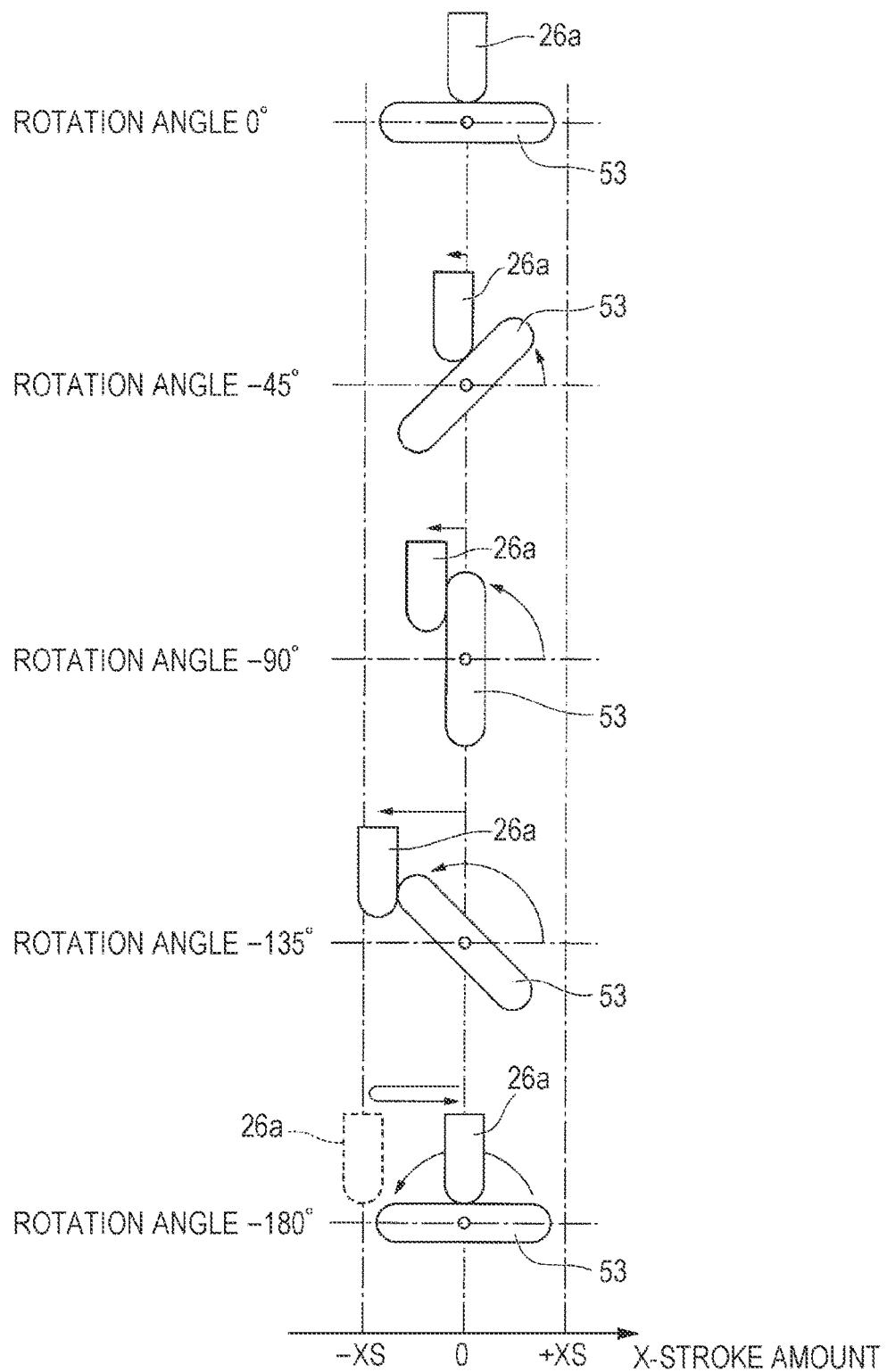
FIG. 12 illustrates an example of a relationship between a rotation angle of a X-direction cam member and movement of a first lever member in the vehicle operating device of the fourth variation of the embodiment.

As illustrated in FIG. 11, when the finger P of the operator moves from a left upper portion toward a right upper portion on the pad surface 11A in the positive X-direction while being in contact with the pad surface 11A, the display controller 13 drives the X-direction motor 55 by sequentially selecting the items 31 one by one as a predetermined item 31 to which the virtual cursor moves (i.e., an item 31 with which the virtual cursor newly comes in contact). Specifically, first, when the virtual cursor moves from the first item (A) 31a outside the second item (B) 31b toward the second item (B) 31b, the display controller 13 uses the second item (B) 31b as the predetermined item 31. In a region from the position Xa1 to the position Xa2 in the X-direction corresponding to the predetermined region of the first item (A) 31a, the display controller 13 stops driving the X-direction motor 55 and sets the rotation angle of the X-direction cam member 53 at zero. In this manner, as illustrated in FIG. 12, the X-stroke amount becomes zero. In a region from the position Xa2 to the position Xb0 at the boundary of the second item (B) 31b adjacent to the first item (A) 31a in the X-direction corresponding to a region except the predetermined region of the first item (A) 31a, the display controller 13 rotates the X-direction cam member 53 in a first rotation direction (e.g., counterclockwise in FIG. 12) from a rotation angle of zero to a rotation angle of −180° by driving the X-direction motor 55. In this manner, the display controller 13 moves the pad surface 11A in the direction opposite to the direction of contact operation with the finger P (i.e., the negative X-direction) so that the X-stroke amount decreases from zero toward the minimum value (=−XS). When the virtual cursor reaches the boundary of the second item (B) 31b, the display controller 13 sets the rotation angle of the X-direction cam member 53 in the first rotation direction at −180° so that the state in which the X-direction cam member 53 presses the first lever member 26a in the negative X-direction is canceled. In this manner, the display controller 13 moves the pad surface 11A in the direction of contact operation with the finger P (i.e., the positive X-direction) under the elastic force of the X-direction elastic member 51 so that the X-stroke amount changes stepwise (e.g., within a time of 10 ms) from the minimum value (=−XS) to zero.

Next, when the virtual cursor moves from the second item (B) 31b outside the third item (C) 31c toward the third item (C) 31c, the display controller 13 uses the third item (C) 31c as the predetermined item 31. In a region from the position Xb0 to the position Xb2 in the X-direction corresponding to the predetermined region of the second item (B) 31b, the display controller 13 stops driving the X-direction motor 55 and sets the rotation angle of the X-direction cam member 53 at −180°. In this manner, as illustrated in FIG. 12, the X-stroke amount becomes zero. In a region from the position Xb2 to the position Xc0 at the boundary of the third item (C) 31c adjacent to the second item (B) 31b in the X-direction corresponding to a region except the predetermined region of the second item (B) 31b, the display controller 13 rotates the X-direction cam member 53 in the first rotation direction from a rotation angle of −180° to a rotation angle of −360° by driving the X-direction motor 55. In this manner, the display controller 13 moves the pad surface 11A in the direction opposite to the direction of contact operation with the finger P (i.e., the negative X-direction) so that the X-stroke amount decreases from zero to the minimum value (=−XS). When the virtual cursor reaches the boundary of the third item (C) 31c, the display controller 13 sets the rotation angle of the X-direction cam member 53 in the first rotation direction at −360° so that the state in which the X-direction cam member 53 presses the first lever member 26a in the negative X-direction is canceled. In this manner, the display controller 13 moves the pad surface 11A in the direction of contact operation with the finger P (i.e., the positive X-direction) under the elastic force of the X-direction elastic member 51 so that the X-stroke amount changes stepwise (e.g., within a time of 10 ms) from the minimum value (=−XS) to zero.

Next, when the virtual cursor moves in the third item (C) 31c, the display controller 13 stops driving the X-direction motor 55 in a region from the position Xc0 to the position Xc1 in the X-direction corresponding to the predetermined region of the third item (C) 31c, and sets the rotation angle of the X-direction cam member 53 at −360°. In this manner, the X-stroke amount becomes zero.

Figure 13:
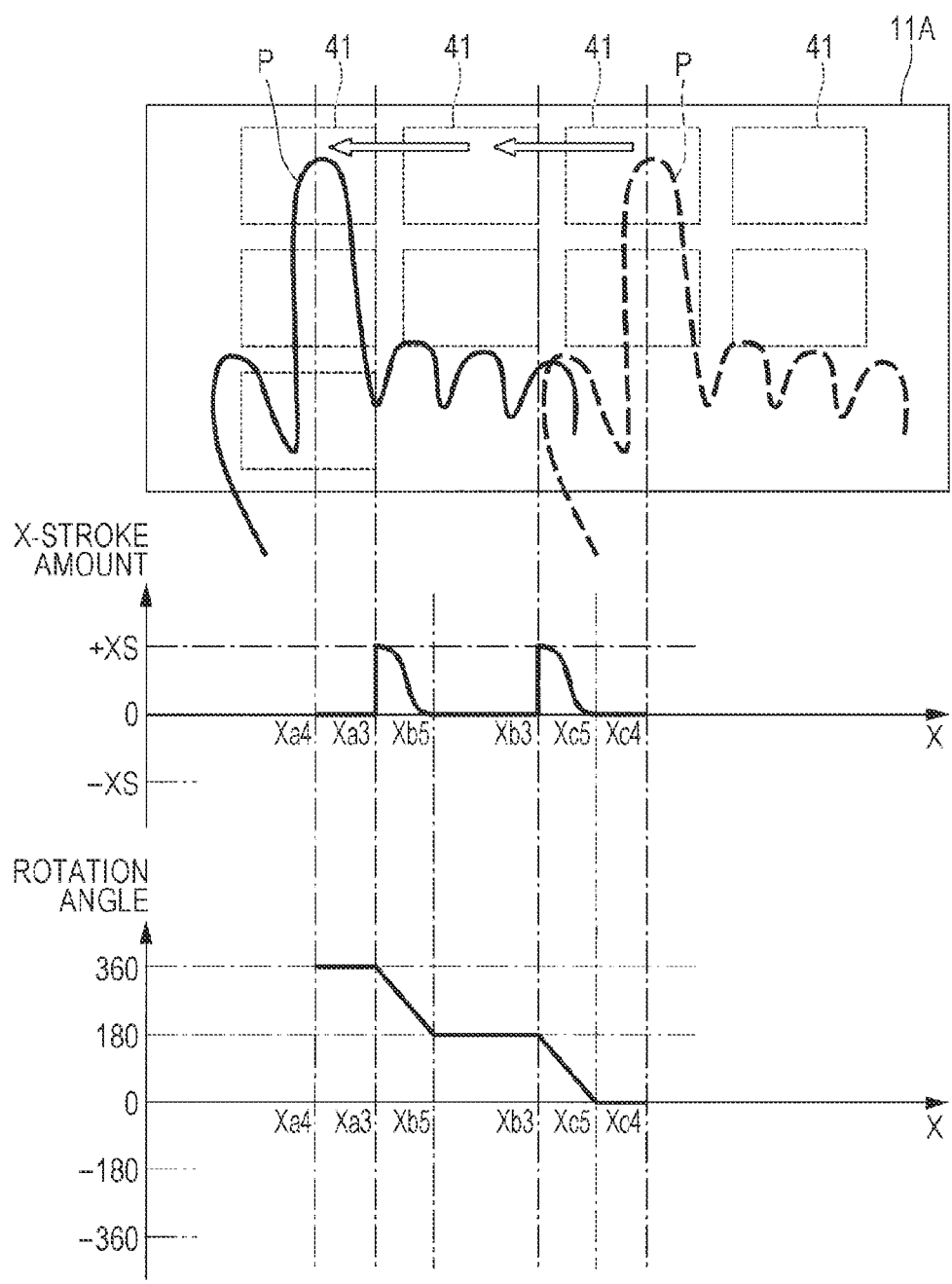
FIG. 13 illustrates an example of a relationship among the contact operation with the finger of the operator on the pad surface of the track pad, the X-stroke amount, and the rotation angle of the X-direction cam member in the vehicle operating device of the fourth variation of the embodiment.

As illustrated in FIG. 13, when the finger P of the operator moves from a right upper portion toward a left upper portion on the pad surface 11A in the negative X-direction while being in contact with the pad surface 11A, the display controller 13 drives the X-direction motor 55 by sequentially selecting the items 31 one by one as a predetermined item 31 to which the virtual cursor moves (i.e., an item 31 with which the virtual cursor newly comes in contact).

Figure 14:
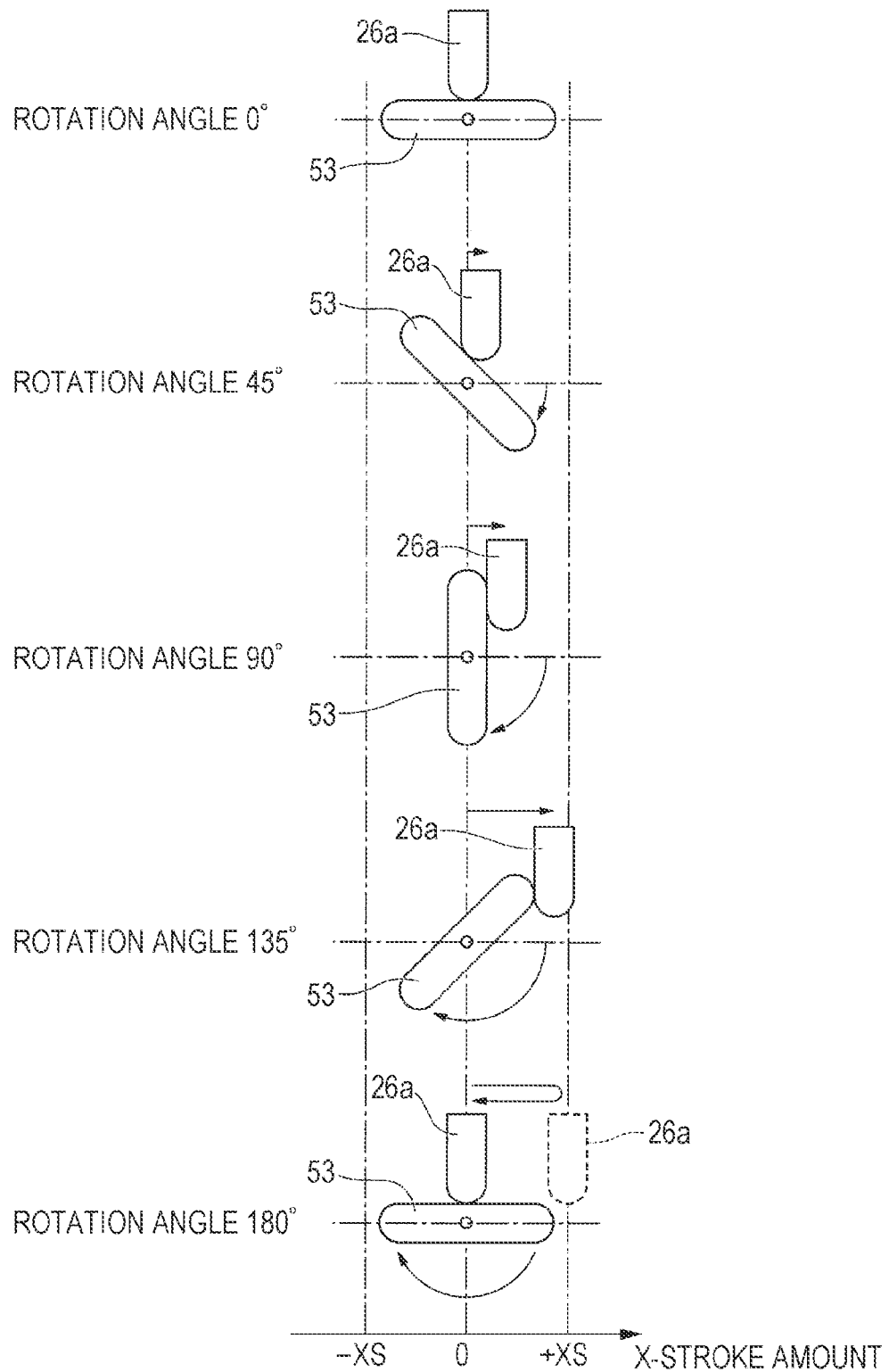
FIG. 14 illustrates an example of a relationship between the rotation angle of the X-direction cam member and movement of the first lever member in the vehicle operating device of the fourth variation of the embodiment.

Specifically, first, when the virtual cursor moves from the third item (C) 31c outside the second item (B) 31b toward the second item (B) 31b, the display controller 13 uses the second item (B) 31b as the predetermined item 31. In a region from the position Xc4 to the position Xc5 in the X-direction corresponding to the predetermined region of the third item (C) 31c, the display controller 13 stops driving the X-direction motor 55 so that the rotation angle of the X-direction cam member 53 is zero. In this manner, as illustrated in FIG. 14, the X-stroke amount becomes zero. In a region from the position Xc5 to the position Xb3 at the boundary of the second item (B) 31b adjacent to the third item (C) 31c in the X-direction corresponding to a region except the predetermined region of the third item (C) 31c, the display controller 13 rotates the X-direction cam member 53 in the second rotation direction (e.g., clockwise in FIG. 14) from a rotation angle of zero to a rotation angle of +180° by driving the X-direction motor 55. In this manner, the display controller 13 moves the pad surface 11A in the direction opposite to the direction of contact operation with the finger P (i.e., the positive X-direction) so that the X-stroke amount increases from zero to the maximum value (=+XS). When the virtual cursor reaches the boundary of the second item (B) 31b, the display controller 13 sets the rotation angle of the X-direction cam member 53 in the second rotation direction at +180° so that the state in which the X-direction cam member 53 presses the first lever member 26a in the positive X-direction is canceled. In this manner, the display controller 13 moves the pad surface 11A in the direction of contact operation with the finger P (i.e., the negative X-direction) under the elastic force of the X-direction elastic member 51 so that the X-stroke amount changes stepwise (e.g., within a time of 10 ms) from the maximum value (=+XS) to zero.

When the virtual cursor moves from the second item (B) 31b outside the first item (A) 31a toward the first item (A) 31a, the display controller 13 uses the first item (A) 31a as the predetermined item 31. In a region from the position Xb3 to the position Xb5 in the X-direction corresponding to the predetermined region of the second item (B) 31b, the display controller 13 stops driving the X-direction motor 55 and sets the rotation angle of the X-direction cam member 53 at +180°. In this manner, as illustrated in FIG. 14, the X-stroke amount becomes zero. In a region from the position Xb5 to the position Xa3 at the boundary of the first item (A) 31a adjacent to the second item (B) 31b in the X-direction corresponding to a region except the predetermined region of the second item (B) 31b, the display controller 13 rotates the X-direction cam member 53 in the second rotation direction from a rotation angle of +180° to a rotation angle of +360° by driving the X-direction motor 55. In this manner, the display controller 13 moves the pad surface 11A in the direction opposite to the direction of contact operation with the finger P (i.e., the positive X-direction) so that the X-stroke amount increases from zero to the maximum value (=+XS). When the virtual cursor reaches the boundary of the first item (A) 31a, the display controller 13 sets the rotation angle of the X-direction cam member 53 in the second rotation direction at +360° so that the state in which the X-direction cam member 53 presses the first lever member 26a in the positive X-direction is canceled. In this manner, the display controller 13 moves the pad surface 11A in the direction of contact operation with the finger P (i.e., the negative X-direction) under the elastic force of the X-direction elastic member 51 so that the X-stroke amount changes stepwise (e.g., within a time of 10 ms) from the maximum value (=+XS) to zero.

Then, when the virtual cursor moves in the first item (A) 31a, the display controller 13 stops driving the X-direction motor 55 in a region from the position Xa3 to the position Xa4 in the X-direction corresponding to the predetermined region of the first item (A) 31a and sets the rotation angle of the X-direction cam member 53 at +360°. In this manner, the X-stroke amount becomes zero. In the fourth variation, in the case of driving the X-direction cam member 53 and the Y-direction cam member 54 at the same time, the display controller 13 controls the rotation angles of the X-direction cam member 53 and the Y-direction cam member 54 to the same value, thereby displacing the pad surface 11A in an oblique direction at an angle of 45° relative to the X-direction and the Y-direction, respectively.

Figure 15:
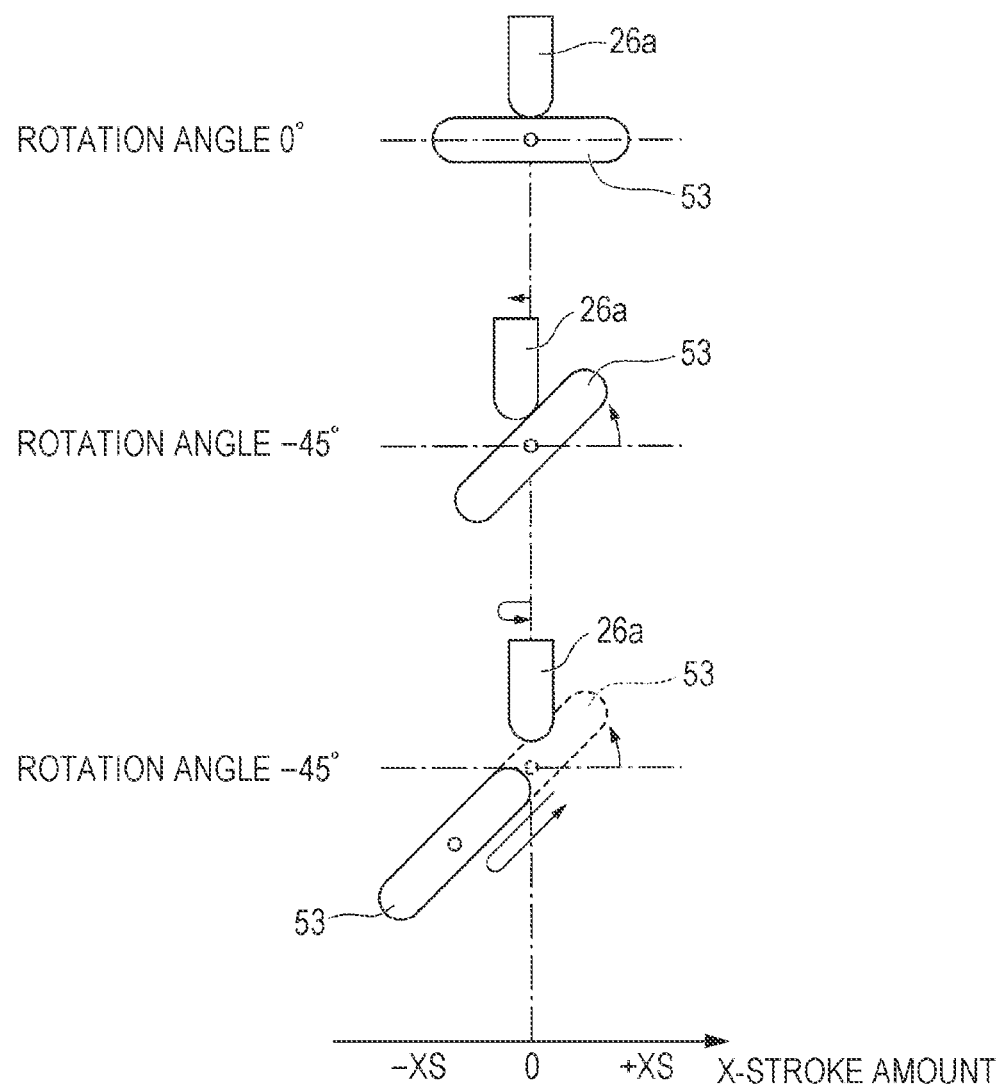
FIG. 15 illustrates an example of a relationship between a rotation angle of an X-direction cam member and movement of a first lever member in a vehicle operating device according to a fifth variation of the embodiment.

A fifth variation of the above-described embodiment will now be described. In the fourth variation of the embodiment described above, each of the X-direction cam member 53 and the Y-direction cam member 54 rotates about the center axis thereof. However, the present disclosure is not limited to this example. The center axis of each of the X-direction cam member 53 and the Y-direction cam member 54 may be moved during rotation of the X-direction cam member 53 or the Y-direction cam member 54. As illustrated in FIG. 15, the display controller 13 may cancel contact with each of the first lever member 26a and the second lever member 26b by displacing the center axis of the X-direction cam member 53 or the Y-direction cam member 54 before the rotation angle of the X-direction cam member 53 or the Y-direction cam member 54 reaches +180° or −180°. In the fifth variation, the maximum value of the moving amount of the pad surface 11A from a reference position to the X-direction or the Y-direction can be changed. In this manner, it is possible to prevent a region (space) necessary for the movement of the pad surface 11A from being excessively large.

Figure 16:
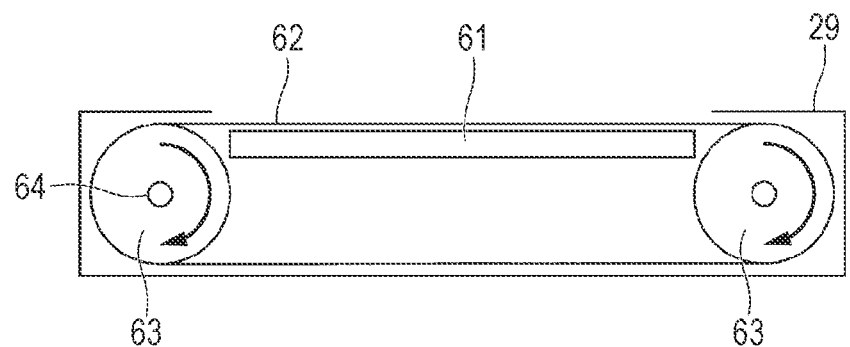
FIG. 16 is a cross-sectional view schematically illustrating a configuration of a vehicle operating device according to a sixth variation of the embodiment and which is taken perpendicularly to a pad surface.

A sixth variation of the above-described embodiment will now be described. In the embodiment described above, the track pad 11 is an optical touch panel. However, the present disclosure is not limited to this example, and the track pad 11 may be of another type such as a resistive film type or a capacitance type. In the above embodiment, the track pad 11 includes the X-direction actuator 27 and the Y-direction actuator 28. However, the present disclosure is not limited to this example. As illustrated in FIG. 16, the track pad 11 may include, in the housing 29, a touch panel 61, an endless belt member 62 covering the surface of the touch panel 61, a pair of cylindrical members 63 bridged with the endless belt member 62, and a motor 64 that drives and rotates the pair of cylindrical members 63.

The touch panel 61 detects a contact operation by a finger of the operator on the surface of the endless belt member 62. The display controller 13 controls operation of the motor 64 in accordance with an operation input detected by the touch panel 61. The display controller 13 drives the motor 64 in accordance with the sliding operation by the finger of the operator in a predetermined direction on the surface of the endless belt member 62 so that the pad surface 11A is moved. The predetermined direction is the direction between the pair of cylindrical members 63.

Figure 17:
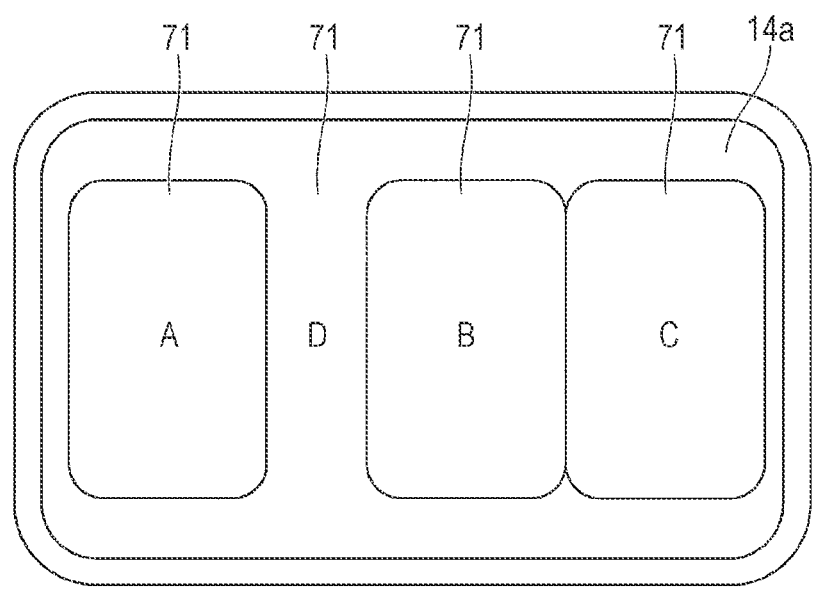
FIG. 17 illustrates an example of a display screen of a display unit in a vehicle operating device according to a seventh variation of the embodiment.

A seventh variation of the above-described embodiment will now be described. In the embodiment described above, the display controller 13 moves the pad surface 11A in accordance with the sliding operation by the finger of the operator on the pad surface 11A with respect to the boundary between the items 31 moved at predetermined intervals on the display screen 14a of the display unit 14. However, the present disclosure is not limited to this example. As illustrated in FIG. 17, the display controller 13 may move the pad surface 11A in accordance with the sliding operation by the finger of the operator on the pad surface 11A with respect to the boundary (e.g., the boundary between adjacent regions, and boundary lines on a map screen) of regions 71 (A-D) displayed on the display screen 14a of the display unit 14.

In the embodiment described above is an example, and is not intended to limit the scope of the present disclosure. The embodiment can be implemented in other various modes, and various omission, replacement, and changes may be provided within the scope of the present disclosure. The foregoing embodiment and the variations thereof are included within the spirit and scope of the present disclosure, and also included in the scope of the following claims and their equivalents.

What is claimed is:

1. A vehicle operating device comprising:
   an operation surface that is operated by contact with a finger of an operator;
   an operation surface driver that moves the operation surface in a direction parallel to the operation surface;
   a contact position detector that detects a contact position of the finger of the operator on the operation surface; and
   a display device that displays at least one predetermined region on a display screen, changes a display of the display screen and sets a virtual cursor that virtually moves on the display screen in accordance with the contact operation with the finger of the operator on the operation surface, wherein
   when the virtual cursor reaches a boundary of the predetermined region, the operation surface driver moves the operation surface in a direction along the contact operation with the finger of the operator.

2. The vehicle operating device according to claim 1, wherein
   when the virtual cursor is outside the predetermined region, the operation surface driver moves the operation surface in an opposite direction to the direction along the contact operation.

3. The vehicle operating device according to claim 1, wherein
   the operation surface driver causes a moving amount of the operation surface in a first case to be smaller than the moving amount of the operation surface in a second case, wherein in the first case, the virtual cursor reaches the boundary of the predetermined region when moving from an inside of the predetermined region to an outside thereof, and in the second case, the virtual cursor reaches the boundary of the predetermined region when moving from the outside of the predetermined region to the inside thereof.

4. The vehicle operating device according to claim 1, wherein
the operation surface driver includes:
a first elastic member that applies an elastic force onto the operation surface in a first direction parallel to the operation surface;
a second elastic member that applies an elastic force onto the operation surface in a second direction parallel to the operation surface different from the first direction;
a first cam member that moves the operation surface in the first direction by rotation about a rotation axis;
a second cam member that moves the operation surface in the second direction by rotation about a rotation axis;
a first motor that rotates and drives the first cam member about the rotation axis; and
a second motor that rotates and drives the second cam member about the rotation axis.

5. The vehicle operating device according to claim 1, further comprising
a controller that outputs a signal indicating execution of a predetermined operation in accordance with the predetermined region in contact with the virtual cursor.

6. The vehicle operating device according to claim 2, wherein
when the virtual cursor reaches the boundary of the predetermined region, the operation surface driver moves the operation surface in the direction along the contact operation with a highest moving amount of the operation surface.

7. The vehicle operating device according to claim 6, wherein
when the virtual cursor reaches the boundary of the predetermined region, the operation surface driver switches movement of the operation surface from moving the operation surface in the opposite direction with a highest moving amount of the operation surface to moving the operation surface in the direction along the contact operation.

8. The vehicle operating device according to claim 7, wherein the operation surface driver switches the movement of the operation surface stepwise.

9. The vehicle operating device according to claim 4, wherein the first cam member moves the operation surface against the elastic force applied by the first elastic member, and the second cam member moves the operation surface against the elastic force applied by the second elastic member.

10. The vehicle operating device according to claim 4, wherein the rotation axis of the first cam member and the rotation axis of the second cam member are configured to be shiftable in a direction parallel to the operation surface.

11. A vehicle comprising the vehicle operating device according to claim 1.

12. The vehicle operating device according to claim 1, wherein the display device sets the virtual cursor that virtually moves on the display screen in accordance with the movement of the finger of the operator on the operation surface, and
when the virtual cursor reaches the boundary of the predetermined region, the operation surface driver moves the operation surface in a direction along the movement of the finger of the operator on the operation surface.

13. The vehicle operating device according to claim 1, wherein the operation surface driver includes an actuator.

* * * * *